J. C. KLEESE.
NUT LOCK.
APPLICATION FILED MAY 28, 1912.
1,095,889.
Patented May 5, 1914.
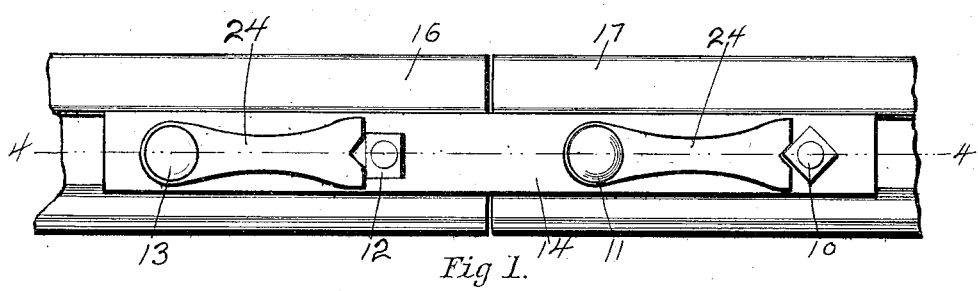
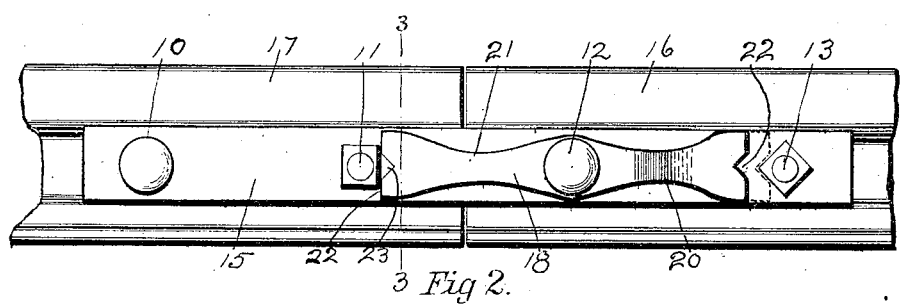
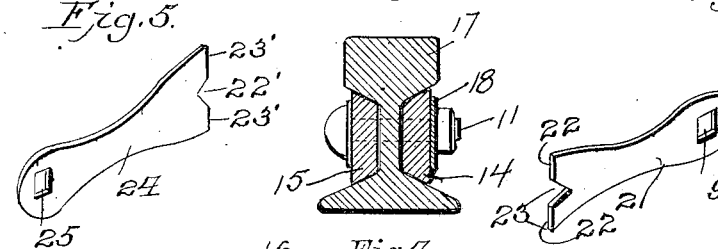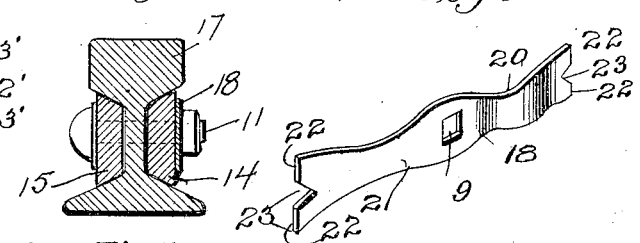
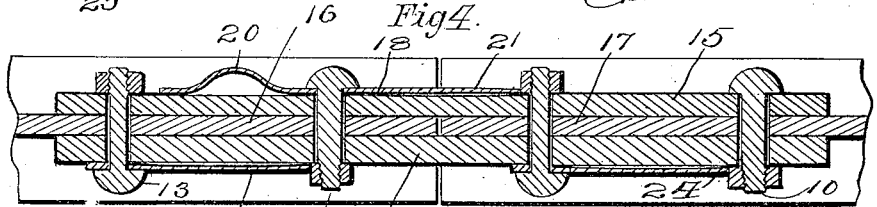
Witnesses
Inventor
James C. Kleese,
Attorneys

UNITED STATES PATENT OFFICE.

JAMES C. KLEESE, OF DENVER, COLORADO.

NUT-LOCK.

1,095,889.  Specification of Letters Patent.  Patented May 5, 1914.

Application filed May 28, 1912. Serial No. 700,291.

*To all whom it may concern:*

Be it known that I, JAMES C. KLEESE, a citizen of the United States, residing at Denver, State of Colorado, have invented certain new and useful Improvements in Nut-Locks; and I do hereby declare the following to be a full, clear, and exact description of the invention, such as will enable others skilled in the art to which it appertains to make and use the same.

This invention relates to nut locks and has for an object to provide a nut lock embodying new and improved features of convenience, reliability and economy.

A further object of the invention is to provide a nut lock especially adapted for use in association with a plurality of bolts and nuts arranged in alinement as they would occur in joining the ends of railroad rails with fish plate attachments, although it is to be understood that the use of such nut lock is not confined to association with rails or fish plates but is applicable to be used in locking nuts in any place or under any condition where bolts and nuts are used in alinement.

With these and other objects in view the invention comprises certain novel constructions, combinations and arrangement of parts as will be hereinafter more fully described and claimed.

In the drawings:—Figure 1 is a view of a conventional fish plate joining the ends of conventional rails, seen in side elevation, showing the improved nut lock. Fig. 2 is a view of the nut lock and rails with a nut lock attachment seen from the side opposite that of Fig. 1. Fig. 3 is a transverse sectional view through a conventional rail with adjacent fish plates and through the improved nut lock as on line 3—3 of Fig. 2. Fig. 4 is a longitudinal sectional view as on line 4—4 of Fig. 1. Fig. 5 is a perspective view of one of the single wing locking members. Fig. 6 is a perspective view of one of the double winged locking members.

Like characters of reference indicate corresponding parts throughout the several views.

The improved nut lock which forms the subject matter of this application is adapted to be used for locking nuts upon bolts arranged in alinement, one example of such arrangement being the use of bolts in joining the ends of railroad rails through fish plates although it is to be understood that such use does not limit the present invention. As shown in the drawings, a plurality of bolts 10, 11, 12 and 13 are inserted through fish plates 14 and 15, joining the adjacent ends of rails 16 and 17. Preferably the bolts are inserted alternately from opposite sides of the rail and upon a bolt as 12 intermediate two other bolts as 11 and 13 a double winged locking member 18 is secured by passing said bolt through the central opening 19 in said locking member. When applied the locking member is curved, as indicated at 20, on both sides of the central opening 19, such curvature shortening the longitudinal extent of the double winged member sufficiently to permit the nuts upon the bolt adjacent the ends of such locking member to be rotated by the wrench in the usual manner until properly seated. When so seated the locking member is straightened by hitting the curve 20 with a hammer or other instrument to straighten the side, as indicated at 21, which moves the engaging end toward the nut, as indicated in dotted lines at Fig. 2. The locking member is provided upon its extremities with V-shaped notches 22 which serve to engage the corners of the nuts if the nut is presented with its corner toward the intermediate bolt, and with squared ends 23 adapted to engage the sides of the nuts if the nuts are presented in such position as to be so engaged, both such engaging positions being shown at Fig. 2, one in full line and the other in dotted line positions.

It is obvious that the locking member 18 may be employed one placed upon the bolt 12 with the ends engaging the nuts of bolts 11 and 13 while another may be placed upon the bolt 11 with its ends engaging the nuts of bolts 10 and 12. Instead, however, of employing two of such double winged members, two single winged members 24 are sometimes employed having openings 25 which engage upon bolts 11 and 13, with notches 22′ and shoulders 23′ which are positioned and proportioned to engage respectively the corners and sides of the nuts of the bolts 10 and 12 as indicated at Fig. 1. The single winged member is of course curved when applied to the bolts the same as the double winged member and is straightened in like manner by being struck by a hammer or other instrument after the nuts are screwed home and when so moved into engaging position with the nuts serves to hold such nuts against return movement until the locking members are again bent out of engagement with the nuts.

I claim:—

1. In a nut lock the combination with adjacent bolts and nuts thereon, of a curved strip of bendable material having one end engaged by one bolt and the opposite end directed toward the nut of the other bolt and so proportioned that when straightened such end will engage against said nut.

2. In a nut lock the combination with adjacent bolts inserted from opposite directions, of a curved strip of bendable material engaged under the head of one bolt with its opposite end directed toward the nut of the other bolt but stopping short a sufficient distance to permit the nut to be rotated, said strip being so proportioned that when straightened the extremity engages the nut.

3. In a nut lock the combination with three bolts in a common plane, of a locking member having an opening engaged under the head of one bolt and its opposite ends directed toward the nuts of opposite bolts, said member being curved to permit the nuts to be rotated and so proportioned that when straightened the ends of the member engage against the nuts of the opposite bolts.

In testimony whereof I affix my signature in presence of two witnesses.

JAMES C. KLEESE.

Witnesses:
 ALBERT L. VOGL,
 A. FRANK JAMES.

---

Copies of this patent may be obtained for five cents each, by addressing the "Commissioner of Patents, Washington, D. C."